US006667263B1

(12) United States Patent
Guillo et al.

(10) Patent No.: US 6,667,263 B1
(45) Date of Patent: Dec. 23, 2003

(54) COMPOSITE MATERIAL

(75) Inventors: Philippe Guillo, Paris (FR); Dale B. Hoggard, Allegheny County, PA (US)

(73) Assignee: Vesuvius Crucible Company, Wilmington, DE (US)

( * ) Notice: Subject to any disclaimer, the term of this patent is extended or adjusted under 35 U.S.C. 154(b) by 0 days.

(21) Appl. No.: 09/856,218

(22) PCT Filed: Nov. 16, 1999

(86) PCT No.: PCT/BE99/00145

§ 371 (c)(1),
(2), (4) Date: Nov. 14, 2002

(87) PCT Pub. No.: WO00/30996

PCT Pub. Date: Jun. 2, 2000

(30) Foreign Application Priority Data

Nov. 19, 1998 (EP) ............................................. 98121935
Dec. 9, 1998 (EP) ............................................. 98123391

(51) Int. Cl.⁷ .................. C04B 35/5833; C04B 35/5835
(52) U.S. Cl. .................... 501/96.4; 501/97.4; 501/98.3; 501/98.6
(58) Field of Search .............................. 501/96.4, 97.4, 501/98.3, 98.6

(56) References Cited

U.S. PATENT DOCUMENTS

| | | | |
|---|---|---|---|
| 3,854,967 A | | 12/1974 | Reinmuth |
| 4,885,264 A | | 12/1989 | Sindlhauser et al. |
| 4,960,734 A | * | 10/1990 | Kanai et al. ................ 501/96.4 |
| 5,227,347 A | | 7/1993 | Fukase et al. |
| 5,389,587 A | | 2/1995 | Nakashima et al. |
| 5,457,075 A | | 10/1995 | Fukushima et al. |
| 5,633,214 A | * | 5/1997 | Nishio et al. ............... 501/96.4 |
| 5,908,795 A | * | 6/1999 | Nishio et al. ............... 501/96.4 |

FOREIGN PATENT DOCUMENTS

| | | | |
|---|---|---|---|
| DE | 2236437 | * | 7/1972 |
| EP | 0396779 | * | 11/1990 |
| EP | 0447940 | * | 9/1991 |
| JP | 2-116617 | * | 5/1990 |
| JP | 6-80471 | * | 3/1994 |

OTHER PUBLICATIONS

Chemical Abstracts; vol. 104, No. 10, JP 60145963, Aug. 1985.
Chemical Abstracts; vol. 112, No. 16, JP 01246178, Oct. 1989.

* cited by examiner

*Primary Examiner*—Karl Group
(74) *Attorney, Agent, or Firm*—James R. Williams; Robert S. Klemz, Jr.

(57) ABSTRACT

The present invention provides a composite pressure-sintered material comprising a continuous phase of hexagonal boron nitride and, dispersed therein, a second material comprising (a) at least one metal nitride selected from the group consisting of silicon, aluminium and titanium nitrides and (b) at least one stable metal oxide; wherein the amount of metal oxide is such that the second material does not contain more than 35% by weight of oxygen. This material possesses a low thermal expansion coefficient and therefore reveals good thermal shock resistance. Another characteristic of this material is its low wettability by molten steel which is thus responsible for excellent chemical resistance to liquid metal. Finally, this material is exceptionally mechanical wear resistant.

18 Claims, No Drawings

COMPOSITE MATERIAL

FIELD OF THE INVENTION

The present invention relates to a new composite material and more particularly to a pressure-sintered material comprising hexagonal boron nitride and a second material comprising at least one metal nitride. In a further aspect, this invention relates to a composite material, which is particularly useful for the manufacture of refractory pieces, which are submitted to severe corrosion and temperature conditions such as refractory pieces for the metallurgic industry, in particular for the steel industry. In particular, this material is especially suitable for the manufacture of side dam plates for strip casting process.

BACKGROUND OF THE INVENTION

In this type of continuous casting, called "strip casting" or "twin-roll casting" for the casting of steel strip of approximately from 2 to 10 mm in thickness, the lateral containment of the liquid metal in the casting space defined by the rolls is provided by plates which are applied against the plane extremities of the rolls, called "ends", by a suitable device. These plates are usually termed "sidewall" or "side dam" plates. Their central part intended to be in contact with the liquid metal is made of refractory material, as is, in general, their periphery which rubs frictionally against the rolls, progressively wearing out the side dam plates. It is absolutely essential that these side dam plates be in contact with the rolls in as sealed a manner as possible, since infiltrations of liquid metal into their contact area would have disastrous effects on the dimensional quality of the cast strip. Parts of the strip would then run the risk of separating from the rest of the strip and remain stuck to the rolls. If this sticking were to persist during one complete revolution of the rolls and if the fragments of edges were thus to penetrate into the casting space, this could give rise to serious damage to the surfaces of the rolls and, by way of consequences, to the strip itself. At worst, these infiltrations of metal could reach as far as the outside of the machine, which would dictate stopping the casting immediately.

Such problems may have many causes, among them being the following:

- distortions of the rolls and of the side dam plates, due to mechanical and thermal stresses which they are exposed to, in particular at the very start of casting when a thermal regime is imposed on them;
- progressive (mechanical and chemical) wear of the side dam plates or of the rolls, which is not always uniform over all their contact areas; and
- instantaneous wear of the side dam plates caused by the passage of an infiltration of solidified metal.

Thus a need exists for a material that would combine resistance to mechanical and thermal stresses and have excellent resistance against chemical or mechanical wear.

A pressure-sintered polycrystalline mixed material is already known from U.S. Pat. No. 4,885,264. This document discloses materials with a base of boron nitride, oxides and carbides in which the hexagonal boron nitride fraction is from about 30 to about 85% by weight. The oxide fraction is selected from the group comprising zirconium oxide and magnesium oxide and is from about 10 to about 50% by weight. The carbide fraction is selected from the group comprising silicon carbide, titanium carbide and zirconium carbide and is from about 5 to about 20% by weight. This material has a density higher than 94% of the theoretically possible density (based on the boron nitride/oxide/carbide mixture). According to U.S. Pat. No. 4,885,264, this material is resistant to liquid metals, wear resistant and thermal shock resistant and therefore, suitable for use as detachment or break rings in the horizontal continuous casting of steel and non-ferrous metals.

However, it has been observed that, mainly due to a high thermal expansion coefficient, this material does not exhibit sufficient thermal shock resistance. The chemical resistance to liquid metal also needs to be improved.

Another material is known from U.S. Pat. No. 5,389,587 which discloses an ordinary pressure sintered ceramic material comprising at least 50% by weight of hexagonal boron nitride and from 1 to 50% by weight of two or more components selected from aluminium and silicon nitride and oxide. The mechanical resistance of this material is still far from the requirements of the steel industry, for example for the manufacture of side dam plates.

Thus, a need still exists for a material that would combine resistance to mechanical and thermal stresses and have excellent resistance against chemical or mechanical wear and especially, which would have an excellent chemical resistance to liquid metal.

SUMMARY OF THE INVENTION

According to the invention, one or more of these needs are achieved with a composite pressure-sintered material comprising a continuous phase of hexagonal boron nitride and, dispersed therein, a second material comprising:

(a) at least one metal nitride selected from the group consisting of silicon, aluminium or titanium nitride, and (b) at least one stable metal oxide; the amount of metal oxide being such that the second material does not contain more than 35% by weight of oxygen.

It has been observed that this material possesses a relatively low thermal expansion coefficient and therefore exhibits good thermal shock resistance. Another characteristic of this material is its low wettability by molten steel which is thus responsible for improved resistance to liquid metal and reduces the occurrence of steel solidification thereon. Finally, it has been observed that this material exhibits exceptional mechanical wear resistance.

DETAILED DESCRIPTION OF THE INVENTION

The crystalline structure of hexagonal boron nitride is essentially constituted of planes which are supposed to play a role in the prevention of cracks propagation. Therefore, the composite material must contain a continuous phase of hexagonal boron nitride. It has been determined that an amount of at least 45% by weight of hexagonal boron nitride, and more preferably of at least 55% by weight of hexagonal boron nitride, allows to obtain a continuous phase of boron nitride.

On the other hand, material from hexagonal boron nitride alone is too soft and has unduly low mechanical strength with the result that the material has a high tendency to chipping and wearing. Therefore, the composite material should contain less than 80% by weight of hexagonal boron nitride and more preferably less than 70% by weight.

Therefore, the invention also relates to composite pressure-sintered material comprising from 45 to 80% by weight of hexagonal boron nitride and from 55 to 20% by weight of a second material comprising:

(a) at least one metal nitride selected from the group consisting of silicon, aluminium and titanium nitride, and (b) at least one stable metal oxide in an amount such that the second material does not contain more than to 35% by weight of oxygen.

The best results have been obtained with materials comprising 57.5% by weight of hexagonal boron nitride.

According to the invention, the composite material comprises at least one metal nitride selected from the group consisting of silicon, aluminium and titanium nitrides. Advantageously, silicon nitride is used.

According to a preferred embodiment of the invention, the second material may contain at least one stable metal oxide in an amount such that the second material does not contain more than 35% by weight of oxygen.

Preferably, the second material contains at least 2.5% by weight of oxygen.

It is necessary that the selected stable metal oxides, if any, are able to form a solid solution into said metal nitride. This is generally the case when the atomic number of the heavier metal atom of said stable metal oxides is not higher than the atomic number of the heavier metal atom of said metal nitride.

Suitable stable metal oxides comprise, but are not limited to, oxides of aluminium, titanium, silicon and magnesium or mixtures thereof. Among these, aluminium oxide is preferred.

In a particular embodiment of the invention, use is made of Sialon as a second material containing oxygen. Sialon is a well-known material and, as the name implies is a material composed of Si-Al-O-N and may be described as a solid solution of alumina in silicon nitride. The normal chemical formula of Sialon is given by $Si_{6-z}Al_zO_zN_{8-z}$, wherein z is comprised between 0 and about 4.5. According to the invention, z is preferably comprised between 1 and 4.5 and more preferably between 2 and 3.

It is to be understood that the composite material may also comprise conventional additives such as yttrium, magnesium, calcium and/or cerium oxides which present melting phases at high temperature and which are preferred over boron oxide.

These additives are added in minor amounts not exceeding 5% by weight of the mixture hexagonal boron nitride/second material.

As starting materials for the production of the composite material of the invention, use is advantageously made of hexagonal boron nitride powder having an oxygen content of from about 2 to about 8% by weight and a specific surface of from about 5 m$^2$/g to about 30 m$^2$/g (measured by the BET method) and of the metal nitride and oxide powder, respectively, with a purity of at least about 95% in each case.

These powders may be homogeneously mixed in a manner known, per se, in a standard mixing apparatus optionally with a temporary binder being used at the same time and then pressure-sintered until the density of at least about 94% of the theoretical density is achieved. In this process, the mixtures may be hot-pressed in graphite moulds, with axial pressure application at temperatures of from about 1500° C. to about 1800° C., and preferably from about 1650° C. to about 1750° C., with a die pressure of from about 10 to about 40 MPa, and preferably from about 15 to about 35 MPa. Alternatively, the mixtures may also be isostatically hot-pressed in a vacuum tight closed case at a temperature of from about 1400° C. to about 1700° C., and preferably from about 1500° C. to about 1600° C. under a pressure of from about 100 to about 300 MPa, and preferably from about 100 to about 200 MPa in a high-pressure autoclave using an inert gas as a pressure transfer medium. Suitable shaped parts with the required dimensions are machined out of the ingots thus obtained.

The new composite material according to the invention finds its main application as side dam plates for strip casting process, but also in other applications where its exceptional resistance to mechanical and thermal stresses and its excellent resistance against chemical or mechanical wear are of importance; for example as sliding plate, in a sliding gate for a metallurgical vessel such as a tundish or a ladle.

The new composite material according to the invention is so performing, especially as to its erosion and thermal shock resistance, that it is now possible to use more than one time a side dam plate comprising a composite material according to the invention. This represents a major breakthrough in the strip casting process since this has never been achieved in the past and, even, was regarded as unimaginable.

The subsequent use(s) of the side dam plate according to the invention may be carried out either with the same face contacting the metal or, alternatively, with the reverse side contacting the metal.

The side dam plate according to the invention may be reused directly. However, if the face which has already been put into contact with the liquid metal is to be put again into contact with the liquid metal, it may be necessary to equalise said face of the plate.

Therefore, the invention also relates to an improvement of the strip casting process wherein the lateral containment of the liquid metal in the casting space defined by the rolls is provided by side dam plates which are applied against the plane extremities of the rolls. This improvement consists in using a side dam plate which is reusable and/or which has already been used.

The subject of the invention is explained in more details in the following examples:

EXAMPLES

The following powder mixtures have been prepared:

In the examples 1 to 5 according to the invention, the second material is silicon nitride containing oxygen, which has been introduced under the form of alumina and of magnesia. In these examples, use has been made of a Sialon with z=2 obtained by known methods such as solid reaction of silicon nitride with alumina or by carbo-reduction under ammoniac atmosphere of a mixture of silicon and aluminium oxides. Three percent (by weight of Sialon) of MgO is added to the Sialon. This leads to oxygen content of 11.45% for the second material.

In the examples 3 and 4, 1% (by weight of Sialon) of yttrium oxide ($Y_2O_3$) was also added.

TABLE 1

| Example | Boron nitride (% by weight) | Second Material (% by weight) | MgO (% by weight of Sialon) | $Y_2O_3$ (% by weight of Sialon) |
|---|---|---|---|---|
| 1 | 50 | 50 | 3 | 0 |
| 2 | 65 | 35 | 3 | 0 |
| 3 | 50 | 50 | 3 | 1 |
| 4 | 65 | 35 | 3 | 1 |
| 5 | 57.5 | 42.5 | 3 | 0 |

By way of comparison, a powder mixture comprising 50% by weight of hexagonal boron nitride, 40% by weight of zirconia ($ZrO_2$) and 10% by weight of silicon carbide was also prepared (example C1).

The powder mixtures prepared at examples 1 to 5 and C1 were hot pressed at a temperature of 1650° C. with a die pressure of 20 MPa.

Table 2 shows the results achieved using the materials of example 1 to 5 and C1.

TABLE 2

| Example | Thermal expansion coefficient ($10^{-6}K^{-1}$) | R factor (ΔT necessary to initiate a crack) (° C.) | Wettability (vs. stainless steel at 1550° C.) |
|---|---|---|---|
| 1 | 2.5 | 488 | 130 to 150° |
| 2 | 2.55 | 879 | — |
| 3 | 1.75 | 915 | — |
| 4 | 2.0 | 529 | — |
| 5 | 1.85 | 596 | 130 to 150° |
| C1 | 3.3 | 337 | 100 to 110° |

It appears clearly from the comparison between examples 1 to 5 and example C1 that the material according to the invention exhibits a very low coefficient of thermal expansion and has then an excellent resistance to thermal stresses. This appears also from the values measured for the R factor (thermal shock resistance calculated by the formula:

$$R = \frac{\sigma(1-v)}{\varepsilon\alpha}$$

Wherein σ represents the flexural modulus (MOR), ν represents the Poisson's ratio, ε represents the Young's modulus and α represents the thermal expansion coefficient) showing that the material according to the invention may resist to 2 to 3 times the ΔT which is sufficient to cause crack in the material of the art. The values observed for the wettability show that the material according to the invention is poorly wettable by molten steel, this may also be observed in placing a drop of liquid stainless steel at 1 550° C. under an atmosphere of argon on a sample of the material. After removal of the steel, an interaction zone of 250 μm depth is observed with the material of example C1, while in the case of the material according to the invention (example 5), an interaction zone of only 50 μm may be observed.

What is claimed is:

1. A composite article for use in refractory applications formed by pressure-sintering and comprising:
    a continuous phase of hexagonal boron nitride; and
    a second material dispersed in the boron nitride comprising at least one metal nitride selected from the group consisting of silicon nitride, aluminum nitride, titanium nitride, zirconium nitride and mixtures thereof, and up to 35 wt. % oxygen as at least one stable metal oxide.
2. The composite article of claim 1
    comprising 45–80 wt. % hexagonal boron nitride and 20–50 wt. % metal nitride.
3. A composite article for use in refractory applications formed by pressure-sintering and comprising 45–80 wt. % hexagonal boron nitride and 20–50 wt. % of at least one metal nitride selected from the group consisting of silicon nitride, aluminum nitride, titanium nitride, zirconium nitride and mixtures thereof, wherein the metal nitride includes up to 35 wt. % oxygen as at least one stable metal oxide.
4. The composite article of claim 1,
    wherein the stable metal oxide can form a solid solution with the metal nitride.
5. The composite article of claim 1,
    wherein the metal nitride comprises a first metal having a first atomic weight, the stable metal oxide comprises a second metal having a second atomic weight, and the first atomic weight is not greater than the second atomic weight.
6. The composite material article of claim 5,
    wherein the metal nitride comprises a plurality of metal nitrides, the stable metal oxide comprises a plurality of metal oxides, the first metal has the highest atomic weight of metals in the metal nitrides, and the second metal has the highest atomic weight of metals in the metal oxides.
7. The composite article of claim 1
    comprising 55–70 wt. % hexagonal boron nitride.
8. The composite article of claim 1,
    wherein the metal nitride comprises silicon nitride.
9. The composite article of claim 1,
    wherein the second material includes at least 2.5 wt. % oxygen as the stable metal oxide.
10. The composite article of claim 1,
    wherein the stable metal oxide is selected from the group consisting of alumina, titania, zirconia, silica, magnesia and mixtures thereof.
11. The composite article of claim 1,
    wherein the stable metal oxide comprises alumina.
12. The composite article of claim 1,
    wherein the second material comprises silicon nitride and alumina.
13. The composite article of claim 12,
    wherein the second material comprises Sialon having a chemical formula $Si_{6-z}Al_zO_zN_{8-z}$ where z is from 1 to 4.5.
14. The composite article of claim 13,
    wherein z is from 2 to 3.
15. The composite article of claim 1,
    wherein the second material comprises at least a portion of a side dam plate.
16. The composite pressure-sintered article of claim 15, wherein the side dam plate comprises Sialon having a chemical formula $Si_{6-z}Al_zO_zN_{8-z}$ where z is from 1 to 4.5.
17. A composite article for use in refractory applications formed by pressure-sintering and comprising:
    a continuous phase of hexagonal boron nitride; and
    a second material dispersed in the boron nitride comprising silicon nitride and up to 35 wt. % oxygen as alumina.
18. The composite article of claim 17,
    wherein the material comprises at least a portion of a side dam plate.

* * * * *